United States Patent
Wertsching et al.

(10) Patent No.: US 7,312,175 B2
(45) Date of Patent: Dec. 25, 2007

(54) ION EXCHANGE MATERIALS, METHOD OF FORMING ION EXCHANGE MATERIALS, AND METHODS OF TREATING LIQUIDS

(75) Inventors: Alan K. Wertsching, Idaho Falls, ID (US); Eric S. Peterson, Idaho Falls, ID (US); John E. Wey, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 450 days.

(21) Appl. No.: 10/920,932

(22) Filed: Aug. 18, 2004

(65) Prior Publication Data

US 2006/0037912 A1    Feb. 23, 2006

(51) Int. Cl.
*B01J 20/22* (2006.01)
(52) U.S. Cl. ..................... 502/401; 502/407
(58) Field of Classification Search ............... 502/401, 502/407
See application file for complete search history.

(56) References Cited

U.S. PATENT DOCUMENTS

| | | | |
|---|---|---|---|
| 4,338,377 A * | 7/1982 | Beck et al. ............. | 428/428 |
| 6,100,339 A * | 8/2000 | Watanabe et al. ............. | 525/216 |
| 6,179,898 B1 | 1/2001 | Poncelet et al. | |
| 6,686,035 B2 | 2/2004 | Jiang et al. | |
| 2003/0075508 A1 | 4/2003 | Woodruff et al. | |
| 2003/0194555 A1 | 10/2003 | Campbell et al. | |

* cited by examiner

*Primary Examiner*—Chester T. Barry
(74) *Attorney, Agent, or Firm*—Wells St. John P.S.

(57) ABSTRACT

The invention includes an ion affinity material having an organic component which is sulfonated and which is chemically bonded to an inorganic substrate component. The invention includes a method of forming a metal binding material. A solid support material comprising surface oxide groups is provided and an organic component having at least one alkyl halide is covalently linked to at least some of the surface oxide groups to form a modified support material. The at least one alkyl halide is subsequently converted into an alkyl sulfonate. The invention further includes a method and system for extracting ions from a liquid. An ion exchange material having a sulfonated alkyl silane component covalently bonded to a metal oxide support material is provided and a liquid is exposed to the ion exchange material.

10 Claims, 1 Drawing Sheet

US 7,312,175 B2

ION EXCHANGE MATERIALS, METHOD OF FORMING ION EXCHANGE MATERIALS, AND METHODS OF TREATING LIQUIDS

GOVERNMENT RIGHTS

This invention was made with Government support under Contract DE-AC07-991D13727 awarded by the U.S. Department of Energy. The Government has certain rights in the invention.

TECHNICAL FIELD

The invention relates to an ion affinity material, a method of forming a metal binding material, methods for extracting ions from a liquid and a system for extracting ions from a liquid.

BACKGROUND OF THE INVENTION

Ion affinity materials are utilized for extracting and/or binding ions present in a liquid. Such materials are useful for processes such as ion exchange chromatography, ion analysis, or removing metal ions from water samples or water supplies such as drinking water.

Ion affinity materials currently utilized as water softening agents are typically polymer beads with reactive pendent functional groups which bind ions in hard water. However, over time or under extremes of temperature and/or pressure these polymer beads can lose cohesion and can degrade resulting in blockages in the water softening and/or plumbing systems. Although some current inorganic systems are available which can survive temperature and pressure differentials, the available systems can be very difficult to regenerate.

It would be desirable to develop new ion affinity materials which can be utilized in water softening applications.

SUMMARY OF THE INVENTION

In one aspect the invention encompasses an ion affinity material having an organic component which is sulfonated, chemically bonded to an inorganic substrate component.

In one aspect the invention encompasses a method of forming a metal binding material. A solid support material comprising surface oxide groups is provided. An organic component is covalently linked to at least some of the surface oxide groups to form a modified support material. The organic component includes at least one alkyl halide which is converted into an alkyl sulfonate after the covalent linking.

In one aspect the invention encompasses a method of extracting ions from a liquid. An ion exchange material having a sulfonated alkyl silane component covalently bonded to a metal oxide support material is provided and a liquid is exposed to the ion exchange material. The invention additionally encompasses a system for extracting metal ions from a liquid which includes a vessel containing ion affinity material having a sulfonated organo-silane group attached to a metal oxide support.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
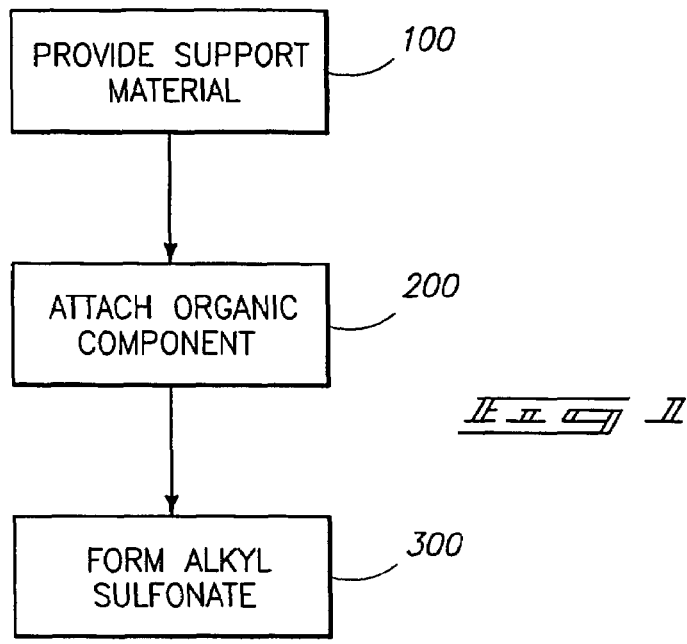
FIG. 1 shows a flowchart diagram illustrating a particular aspect of the present invention.

This disclosure of the invention is submitted in furtherance of the constitutional purposes of the U.S. Patent Laws "to promote the progress of science and useful arts" (Article 1, Section 8).

The invention pertains to an ion affinity material that can be utilized to bind ions present in a liquid sample. Particularly, the invention can be utilized for binding metal ions present in a solution and in particular instances can be utilized to extract metal ions from aqueous solutions. The ion affinity materials can be utilized in specific applications such as ion exchange chromatography, ion analysis and removal of metals from drinking water or other water sources.

Ion affinity material in accordance with the invention can contain an inorganic support material or substrate component. The affinity material can further include an organic component which is chemically bonded to the inorganic substrate component. Preferably the organic component is covalently bonded to the inorganic substrate component. The organic component is sulfonated in at least one site where the sulfonate group confers or enhances cation affinity of the material.

The inorganic component utilized for the substrate preferably provides a solid support for bonding the organic component. Preferably the solid support material comprises a metal with a stable oxide surface. Exemplary materials which can be utilized for the inorganic component include but are not limited to silica, alumina, zirconia and titania. The inorganic component is not limited to any particular form of the respective oxide material and can be any of a variety of sizes, shapes and porosities.

The organic component of the affinity material comprises at least one sulfonated linear or branched alkyl group. In particular instances the sulfonated alkyl group can comprise from one to 35 carbon atoms, and can preferably have from two to ten carbon atoms. The organic component can optionally comprise one or more organic groups in addition to the sulfonated alkyl group. Such additional organic group(s) can be, for example, substituted or non-substituted, linear, branched, cyclic, saturated, unsaturated or aromatic hydrocarbons (discussed further below).

The organic component of the ion affinity material of the invention can preferably be an organo-silane. The organo-silane group is preferably attached to the inorganic support material by covalent bond formation between the silicon atom of the silane group and one or more oxygen atoms of the oxide surface comprised by the inorganic support material. In particular instances, depending upon the formula of the organo-silane, the organo-silane can be bonded to up to three oxygens on a metal oxide surface. In applications where the silane is bi-functional or tri-functional (referring to the presence of one or two organic groups in addition to the sulfonated alkyl group), the silicon can be bonded to one or two oxygen atoms on the surface of the inorganic material. In particular applications it is preferable that the silane group is monofunctionalized (indicating a mono-organic silane having only the sulfonated alkyl as an organic substituent). Where the silane is mono-functionalized, the silicon atom can be bonded to one, two or three oxygens of the metal oxide substrate.

Exemplary methodology for synthesis of an ion affinity material in accordance with the invention is discussed with reference to FIG. 1. In an initial step 100, a support material can be provided. The support material can be an inorganic metal oxide as discussed above and can in particular instances be selected from silica, alumina, zirconia and titania, and can be provided in any of a variety of sizes, shapes and porosities.

Initial step 100 can include cleaning the support material with such cleaning comprising heating in an acid solution. Exemplary cleaning conditions can utilize 1 N nitric acid which can be heated to boiling with occasional stirring. Such exemplary acid washing can be conducted for a period of, for example, 2 hours.

Initial step 100 can further comprise collecting the acid washed support material and rinsing with water. Exemplary rinsing processes can comprise, for example, three independent rinses with water over a filter, such as a coarse glass-fritted filter. The cleaned and rinsed support material can be subsequently dried by, for example, heating in an oven at 120° C. for about 12 hours. The cleaned and dried material can be cooled and placed within a vessel for further reaction. An exemplary vessel can be, for example, a glass column.

Initial step 100 can further comprise wetting the support material with moisturized air which can be blown through the support material using, for example, a glass gas dispersal apparatus. The gas dispersal apparatus can blow dry air through a saturated aqueous solution of sodium bromide to provide a controlled stream of approximately 75% relative humidity. The providing of moisturized air can create a floating fluidized bed of support material as it is flowed from the bottom of the glass column to the top. The moisturizing process can be conducted for a period of, for example, 6 hours with subsequent transfer of the surface wetted support material to a dry reaction vessel such as a round bottom flask or other container.

After initial processing 100, a reaction process 200 can be conducted to attach an organic component to the prepared support material. The reaction vessel containing the support material to be functionalized can be capped and or sealed prior to initiation of reaction 200. An appropriate solvent can be added to the reaction vessel such as, for example, a dry non-polar solvent. A preferred solvent for utilization in the methodology described is hexane due to its very non-polar nature which can avoid drawing moisture away from the wetted support material surface. Exemplary alternative solvents which can be utilized include but are not limited to simple hydrocarbons such as pentane, heptane and octane. Although other non-polar solvents can be utilized, it can be advantageous to avoid utilization of solvents which are capable of forming an azeotrope with water (such as benzene).

Pressure buildup in the reaction vessel can be minimized or avoided by, for example, providing an oil bubbler with a back-flow restrictor. An appropriate organic reagent can be added to the reaction vessel to react with the prepared support material to produce a functionalized support material having at least one alkyl halide group. As discussed above, the organic reagent can preferably be an organosilane and preferably an alkyl silane reagent. Exemplary alkyl silane reagents which can be utilized for purposes of the described methodology are presented in Table 1 with the R groups and substituents being subsequently set forth.

TABLE 1

Alkylsilane Reagents

| Reagent Identifier | Formula |
|---|---|
| I | $X_1R_1$–Si($X_2$)($X_3$)–$X_4$ |
| II | $X_1R_1$–Si($X_2$)($R_2$)–$X_3$ |
| III | $X_1R_1$–Si($X_2$)($R_2$)–$R_3$ |
| IV | $X_1R_1$–SiH$_2$–$X_2$ |
| V | $X_1R_1$–SiH($X_2$)–$R_2$ |
| VI | $X_1R_1$–SiH($X_2$)–$X_3$ |

For each of formulas I-VI presented in Table I, $R_1$ is an alkyl group substituted with $X_1$ (defined below). $R_1$ can be linear or branched, and is preferably non-substituted other than $X_1$. Preferably, $R_1$ contains 35 or fewer carbon atoms, and in particular instances can preferably comprise fewer than 20 carbon atoms, and more preferably from 2 to 10 carbon atoms. Exemplary preferred $R_1$ groups include ethyl, n-propyl, n-butyl, and n-pentyl.

$R_2$ and $R_3$ can be independently selected from an alkyl (linear, cyclic or branched), a substituted alkyl group, and saturated, unsaturated, or aromatic hydrocarbon groups which are substituted or non-substituted. In some instances, one or both of $R_2$ and $R_3$ can be halogenated at one or more sites, can comprise one or more alternate leaving groups, or can comprise a mixture of halogen and other leaving groups. Alternate leaving groups can include, but are not limited halides and alkoxides. In particular applications, one or both of $R_2$ and $R_3$ can be the same as $R_1$.

$X_1$ can be any halide. Preferably, $X_1$ is either chloride or bromide, with chloride being most preferred.

$X_2$, $X_3$ and $X_4$ can be good leaving groups independently selected from alkoxides and halides. Each of $X_2$, $X_3$ and $X_4$ can differ relative to each other or two or all three of $X_2$, $X_3$ and $X_4$ can be identical. Halides for use as $X_2$, $X_3$ and $X_4$ include chloride, fluoride, bromide and iodide, with chloride or bromide being preferred. Exemplary alkoxides which can be utilized include straight chain or branched chain alkoxides, and can be preferably selected from methoxide, ethoxide, propoxide and butoxide.

In particular applications, the silane reagent can preferably have a single organic substituent (e.g. formulas I, IV and VI). It can additionally be preferable that the silane have multiple leaving groups to provide maximum binding sites for binding to the substrate. Accordingly, a highly preferred silane reagent can have formula I, such as 3-chloropropyl-trichlorosilane.

Appropriate conditions for functionalization of the support material by reaction with the organic reagent can comprise adding a ratio of organic reagent to support material surface hydroxyl group of at least 1:1. Since a preferred reaction product has one silane group bound per surface hydroxyl, the silane reagent can be added in excess relative to the number of hydroxyls to achieve efficient surface modification. Accordingly, a preferred reagent weight ratio can be 10 grams of silane reagent to 100 grams of silica substrate. A similar ratio can be utilized for alternative substrate material with appropriate adjustment for the weight of a particular substrate material relative to surface hydroxyl content. The reaction vessel can be heated slightly and can be agitated. The reaction conditions can be continued for a period of several hours with optional addition of additional organic reagent to ensure complete functionalization of the support material surface. In particular instances, reaction completion can be determined by cessation of bubbles and/or gas formation in the reaction vessel (for example, where functionalization produces an acid halide byproduct). The modified support material can be filtered by, for example, utilizing a glass-fritted funnel and can be rinsed with, for example, three portions of hexane or other appropriate solvent (discussed above). Material processing 200 can preferably additionally comprise drying the functionalized support material prior to subsequent processing steps.

After functionalization, the functionalized support material can undergo an additional reaction processing 300 to convert alkyl halide $R_1X_1$ into an alkyl sulfonate. Where the organic group comprises a bi-functional or tri-functional silane where $R_2$ and/or $R_3$ contain one or more halide substituents, such can also undergo conversion to their corresponding sulfonates in sulfonation step 300.

The conversion of halides to their corresponding sulfonate derivatives in processing step 300 can comprise initially placing the functionalized support material into a flask or vessel with water. The modified support material (alkyl halide form) can tend to float on the surface of water. An alcohol, for example, ethanol can be added to decrease the surface tension of the water to allow the functionalized support material to submerge. Where ethanol is utilized, the volume of ethanol added can be, for example, about 1:30 relative to the volume of water in the reaction vessel.

The sulfonation reaction can be achieved by adding an amount of sulfite salt to the reaction vessel and heating the reaction to a low boil. A preferred sulfite salt for methodology of the invention is sodium sulfite. An appropriate amount of sodium sulfite which can be utilized is at least about 0.5 grams of sodium sulfite per 10 grams of alkylated silica (particularly n-propyl silane modified silica). Preferably, the amount of sodium sulfite utilized is about 3 grams per 10 grams of modified silica support material. A similar ratio of sulfite to support material can be utilized for alternative support materials and can be calculated based upon the relative weight of the particular alkylated support material being utilized. The sulfonation reaction conditions can comprise heating the mixture for approximately 4 hours for complete conversion of alkyl chlorides to sulfonate groups. Since the alkyl halide derivative tends to float while the corresponding sulfonated sinks, at least for some alkyl silanes, the reaction can be monitored by observing the amounts of material which floats on the surface of the water relative to the amount material which sinks.

The resulting sulfonated modified support material can be filtered as discussed above with respect to the halogen derivative and can be rinsed with, for example, three portions of water and three portions of methanol. The sulfonated derivative can be dried, for example, in an oven at 120° C. and can subsequently be utilized for various ion affinity applications.

Figure 2:
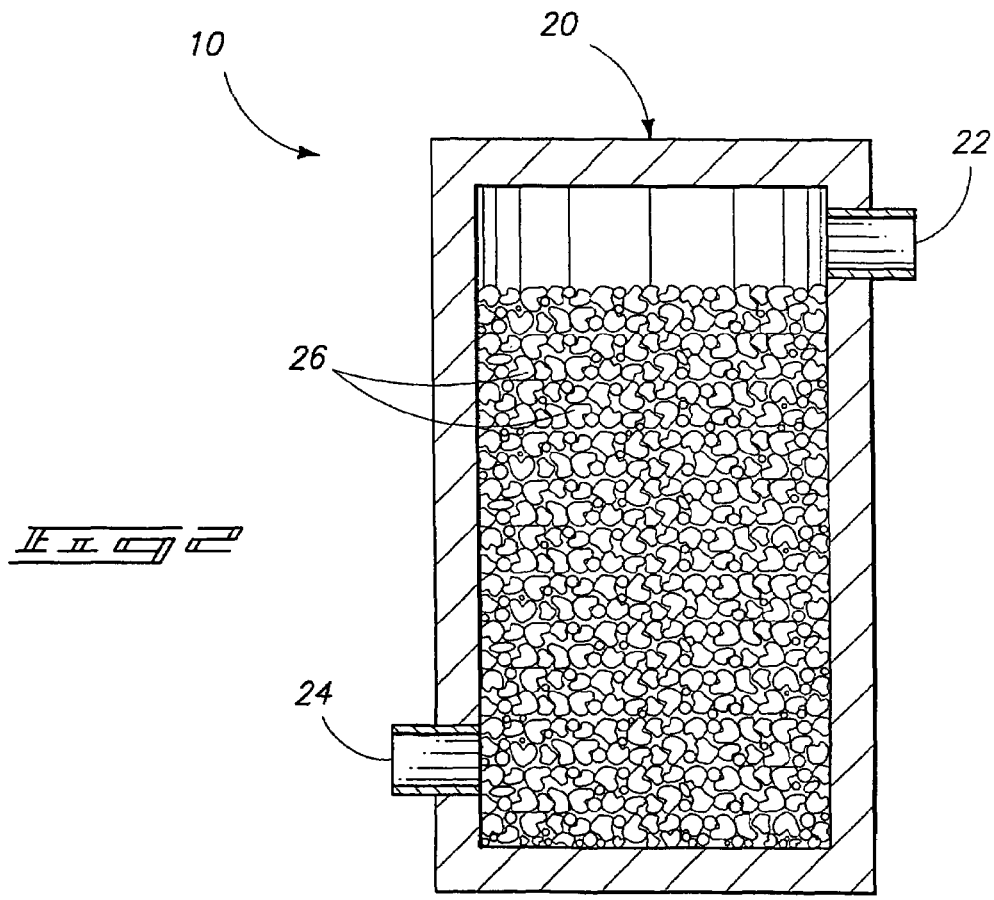
FIG. 2 is a cross sectional view of a liquid treatment device in accordance with one aspect of the invention.

An exemplary liquid treatment apparatus which can be utilized for ion affinity applications in accordance with the invention is shown in FIG. 2. Liquid treatment system 10 can comprise a treatment vessel 20 which can be, for example, a column as shown in FIG. 2. Alternative treatment vessel configurations can be utilized such as, for example, a flask, a beaker, an open container or a sealed vessel. Where a column is utilized such as column 20 shown in FIG. 2, such can comprise an inlet 22 and an outlet 24. Alternatively, a single opening can be provided to function as both an inlet and an outlet, or in particular applications column 20 can provide two or more inlets (not shown) and/or two or more outlets (not shown). Although inlet 22 is shown as being disposed elevationally higher than outlet 24 along column 20, it is to be understood that the invention encompasses alternate positioning of inlet 22 and outlet 24. For example, inlet 22 can be disposed elevationally lower than outlet 24 in some applications.

An ion affinity material or resin 26, which can be any of the materials described above and can be formed in accordance with the above-described methodology, can be provided within column 20. An interior portion of column 20 can be partially filled with ion exchange material 26 as shown in FIG. 2. Alternatively, the column interior can be completely filled or can be filled to a lesser extent relative to that depicted in the figure.

Treatment of a liquid utilizing system 10 can comprise, for example, introducing or flowing a liquid sample such as water into column 20 through inlet 22. The liquid sample can flowed directly through column 20 by, for example, flowing the liquid sample through outlet 24. Alternatively, a liquid sample can be introduced into inlet 22 and can be retained within column 20 to lengthen exposure to ion affinity material 26 and out through outlet 24 without retaining the liquid sample within the column. After a retention period, the treated sample can be removed by flowing through outlet 24. In particular instances, column 20 can be provided with a continuous flow of sample through the column and system 10 can be a treatment system configured for continuous processes. Alternatively, system 10 can be configured for batch wise processing and column 20 can be a batch wise processor.

System 10 can comprise a single treatment vessel 20 as shown in FIG. 2. Alternatively, one or more additional treatment units can be provided within system 10. Such additional units can be provided to additionally treat the liquid sample either prior to introduction into column 20 or after passing through column 20, or both. Such additional units can comprise an ion affinity material produced by methodology of the invention or can alternatively comprise one or more additional ion exchange or other chromatographic material. Further, system 10 can incorporate additional treatment units for removing other impurities or unwanted substances from the liquid samples.

The affinity material of the present invention can be particularly useful for treatment of water or aqueous solutions. Specifically, the ion affinity materials can be useful for removing metal ions from water and can be particularly advantageous for utilization in water softening applications. In contrast to polymer based resins, the organic/inorganic composite resins of the invention are easily regenerated and are heat and pressure resistant. Accordingly, the resulting ion affinity materials are more robust and allow for longer lived ion exchange materials and systems.

EXAMPLE

Synthesis of an Organo-Sulfonate Modified Silica Support for Ion Affinity Applications 200 ml of grade 12 silica gel was introduced into a 600 ml beaker with 300 ml of 1 N nitric acid. The mixture was heated to a slow boil with occasional stirring for 2 hours. The acid washed silica was collected and was rinsed 3 times with 200 ml of water within a coarse glass fritted filter. The clean silica was placed within a 600 ml beaker and was dried in an oven at 120° C. for 12 hours. The clean silica was cooled and placed into a 300 ml glass column.

Moisturized air was blown through the silica via a glass gas dispersal apparatus. The gas dispersal apparatus flows dry air through a saturated aqueous solution of sodium bromide which provides a controlled stream of 75% relative humidity. The moisturized air creates a floating fluidized bed of silica as it flows from the bottom to the top of the glass column. The moisturizing process was continued for 6 hours and the resulting surface wetted silica was transferred to a dry 1 L round bottom flask.

The flask was capped with a rubber septum and 500 ml of dry hexane was added. An oil bubbler with a back-flow restrictor was attached to eliminate pressure buildups. 5 ml of 3-chloropropyltrichlorosilane was added to the flask utilizing a syringe with dry schlenk-line techniques. The flask was agitated and a slight warming of the flask occurred as HCl gas formed. The reaction was continued with additional agitation for several hours while bubbling of HCl was observed. After 24 hours the reaction appeared to cease and an additional 5 ml of 3-chloropropyltrichlorosilane was added to insure complete functionalization of the silica surface.

Upon complete cessation of observed bubble formation, the modified silica gel was filtered with a glass-fritted funnel and rinsed with three portions of hexane (300 ml each). The modified silica was then dried and placed into a 600 ml beaker with 300 ml of water. 10 ml of ethanol was added to decrease the surface tension of the water which allowed the silica to submerge. 30 grams of sodium sulfite was added to the beaker and the mixture was heated to a low boil. The reaction mixture was heated for 4 hours until the alkyl chloride conversion to sulfonate was complete. The completion of the reaction was observable due to migration of the sulfonated product to the bottom of the flask.

The organo-sulfonated silica was filtered on a glass fritted funnel and was rinsed with three portions of water (300 ml each) and three portions of methanol (300 ml each). The resulting sulfonated silica product was dried in an oven at 120° C. The ability of the prepared modified silica ion exchange resin was analyzed. 2 grams of the resulting ion affinity material was placed in a glass column with a Teflon valve. The column was washed three times with 25 ml portions of 2% nitric acid followed by three 25 ml portions of nanopure water in preparation for loading with various cation solutions.

Salt solutions were prepared containing CaCl, or MgCl. Each salt solution contained 105.8 ppm of the Ca or Mg cation. Salt solutions were added to the prepared column in three 5 ml portions followed by three 5 ml portions of nanopure water. Finally, three 5 ml portions of 2% nitric acid were added to strip the extracted cations from the columns.

The column effluent was collected in 5 ml portions during the course of the testing. Each sample was tested for cation concentration using Perkin Elmer Atomic Absorption instrumentation (Perkin Elmer Model #5100 Atomic Absorption Spectrophotometer).

In alternative processing, stripping of the column was performed utilizing NaCl. This stripping process involved utilization of saturated sodium chloride (ion displacement chromatography) in place of the 2% nitric acid strip described above. The overall analysis was otherwise identical to the protocol described above with respect to the 2% nitric acid methodology. Results of the performance evaluation of the sulfonated modified silica affinity material with respect to calcium and magnesium are presented in Tables 2 and 3, respectively.

TABLE 2

| Sample Identification | Mean (mg/L) | Solution Volume (L) | mg |
|---|---|---|---|
| Calcium exchange column results and analysis | | | |
| Calcium ion feed | 105.80 | 0.015 | 1.587 |
| Aliquots 1 and 2 (5 ml each) | 13.35 | 0.010 | 0.134 |
| Aliquot 3 (5 ml) | 47.51 | 0.005 | 0.238 |
| Deinoized water wash (3 × 5 ml) | 11.18 | 0.015 | 0.168 |
| 2% nitric acid strip (3 × 5 ml) | 60.51 | 0.015 | 0.908 |
| Second 2% nitric acid strip (3 × 5 ml) | 1.68 | 0.015 | 0.025 |
| Analysis | | | |
| Ca feed absorbed on column (mg) | | | 1.048 |
| Ca feed absorbed on column (%) | | | 66.05 |
| Absorbed Ca stripped from column (mg) | | | 0.933 |
| Absorbed Ca stripped from column (%) | | | 88.99 |
| Absorbed Ca remaining on column (mg) | | | 0.115 |
| Absorbed Ca remaining on column (%) | | | 11.01 |
| Calcium capacity of silica (ug/g) | | | 523.34 |

Bed volume approximately 5 cm$^3$; weight of sulfonated propylsilane(SPS) functionalized silica = 2.003 grams

| Magnesium exchange column results and analysis | | | |
|---|---|---|---|
| SPS Mg feed | 249.80 | 0.050 | 12.490 |
| SPS Mg 5 ml | 54.66 | 0.005 | 0.273 |
| SPS Mg 10 ml | 220.50 | 0.005 | 1.103 |
| SPS Mg 15 ml | 247.8 | 0.005 | 1.239 |
| SPS Mg 20 ml | 240.3 | 0.005 | 1.202 |
| SPS Mg 25 ml | 244.9 | 0.005 | 1.225 |
| SPS Mg 30 ml | 247.5 | 0.005 | 1.238 |
| SPS Mg 35 ml | 249.8 | 0.005 | 1.249 |
| SPS Mg 40 ml | 247.8 | 0.005 | 1.239 |
| SPS Mg 45 ml | 249.8 | 0.005 | 1.249 |
| SPS Mg 50 ml | 248.6 | 0.005 | 1.243 |
| SPS Mg deionized water wash | 12.28 | 0.100 | 1.228 |
| SPS Mg 1% nitric acid strip | 20.88 | 0.050 | 1.044 |
| Analysis | | | |
| Mg feed absorbed on column (mg) | | | 1.232 |
| Mg feed absorbed on column (%) | | | 9.86 |
| Absorbed Mg stripped from column (mg) | | | 1.044 |
| Absorbed Mg stripped from column (%) | | | 84.76 |
| Absorbed Mg remaining on column (mg) | | | 0.19 |
| Absorbed Mg remaining on column (%) | | | 15.24 |
| Magnesium capacity of silica (ug/g) | | | 408.93 |

Bed volume approximately 6.3 cm$^3$; weight of sulfonated propylsilane (SPS) functionalized silica = 3.012 grams The results of the performance analysis indicate that the ion affinity and exchange properties of the sulfonated organo-silane modified silica affinity material matches or exceeds those properties typically found in commercial water softeners. Accordingly, the materials of the invention perform as well as conventional materials and, in contrast to conventional materials, can be easily regenerated. The materials of the invention additionally advantageously provide improved heat resistance and are more robust allowing longer lived ion exchange and water softening systems.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of forming a metal binding material comprising:
   providing a solid support material comprising surface oxide groups;
   covalently linking an organic component to at least some of the surface oxide groups to form a modified support material, the organic component comprising at least one alkyl halide; and
   after the covalently linking, converting the alkyl halide into an alkyl sulfonate.

2. The method of claim 1 wherein the covalently linking comprises:
   providing an organo-silane reagent; and
   forming a covalent bond between an oxygen of the surface oxide and a silicon atom of the silane.

3. The method of claim 2 wherein the organo-uilane reagent has a formula selected from the group consisting of formula I,

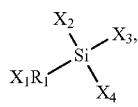

formula II,

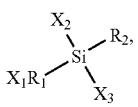

formula III,

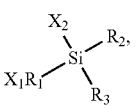

-continued formula IV,

formula V

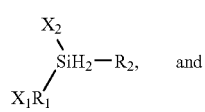 and formula VI

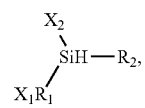

where $X_1$ is a halide, $X_2$, $X_3$ and $X_4$ are independently selected from alkoxides and halides, $R_1$ is a linear or branched, substituted or non-substituted alkyl, and $R_2$ and $R_3$ are independently selected from substituted or non-substituted linear, branched, and cyclic organic groups which are saturated, unsaturated or aromatic.

4. The method of claim 3 wherein the organo-silane reagent has formula I.

5. The method of claim 4 wherein $X_1$, $X_2$, $X_3$, and $X_4$, are each chloride.

6. The method of claim 4 wherein the organo-silane reagent is 3-chloropropyltrichlorosilane.

7. The method of claim 1 wherein the convening the alkyl halide comprises:
   providing the modified support material in water;
   adding a sulfite salt to the water; and
   heating to convert the alkyl halide to the sulfonate.

8. The method of claim 7 wherein the convening the alkyl halide further comprises decreasing the surface tension of the water prior to adding the sulfite salt.

9. The method of claim 7 wherein the sulfite salt comprises sodium sulfite.

10. The method of claim 1 wherein the solid support material comprises a silica material selected from the group consisting of silica gel, titanates, zirconates, aluminates, and vanadium oxides.

* * * * *